May 27, 1930.　　　B. R. BENJAMIN　　　1,760,336
TRACTOR CULTIVATOR
Filed Jan. 14, 1928　　　2 Sheets-Sheet 2
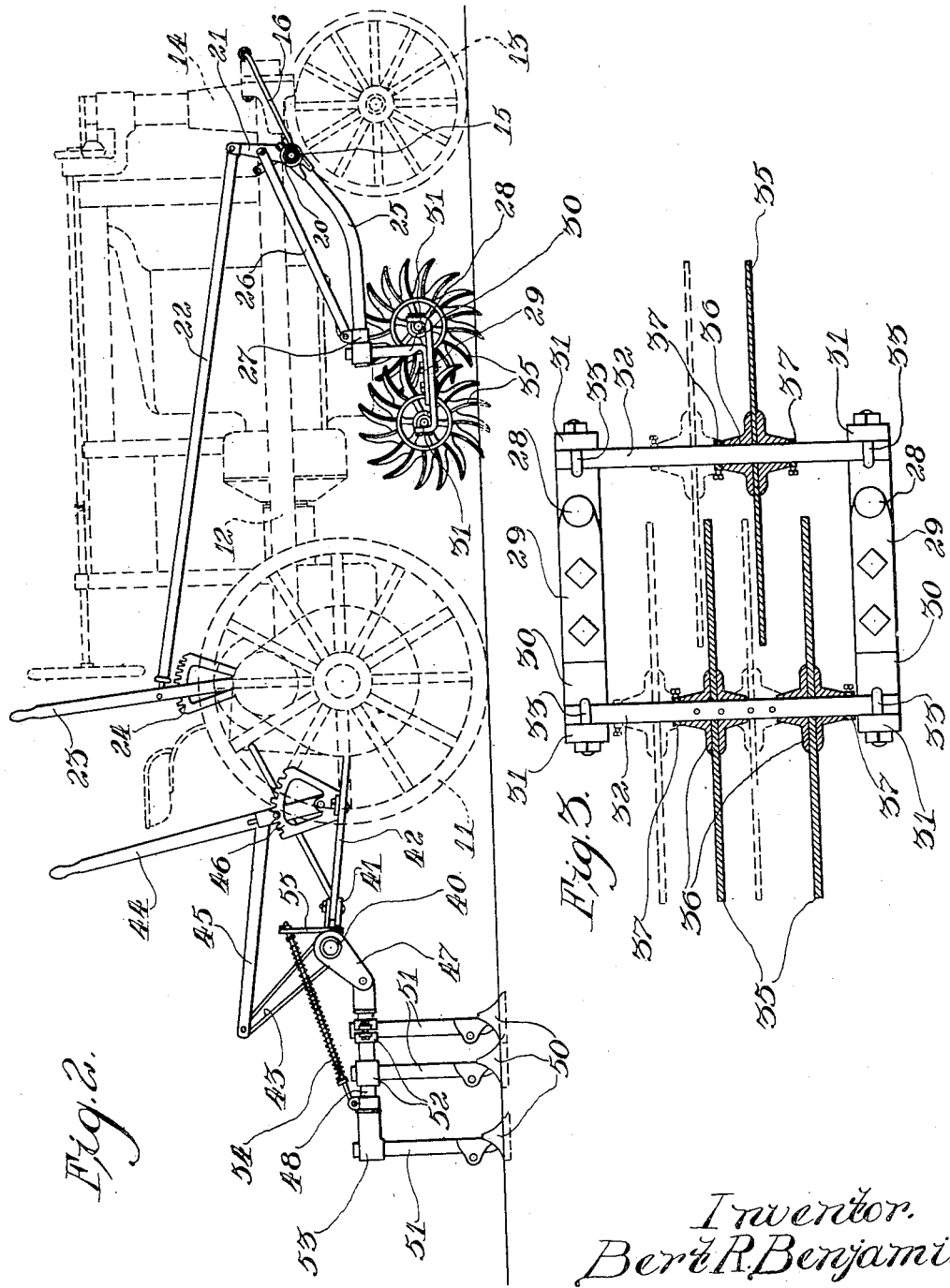

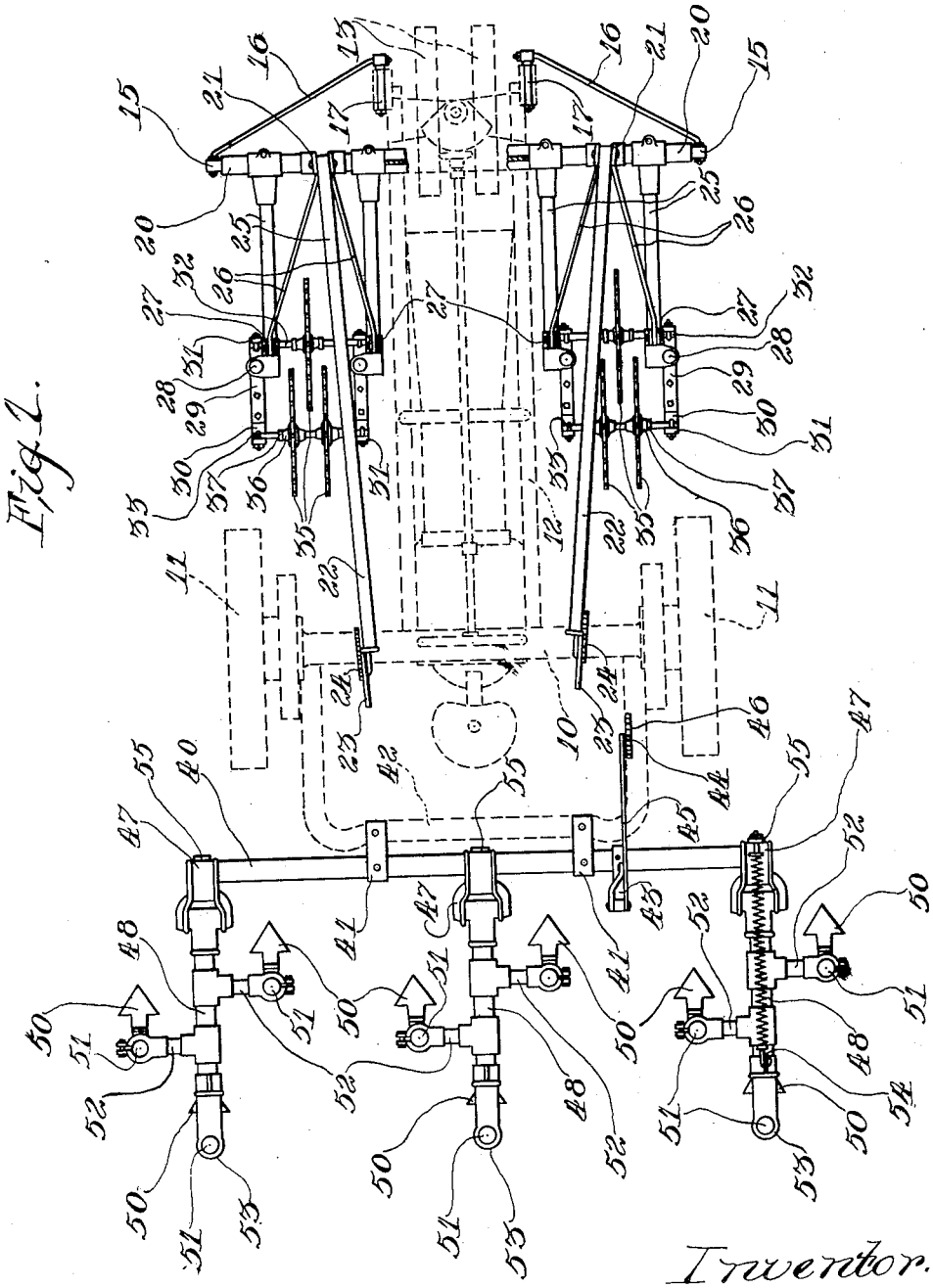

Patented May 27, 1930

1,760,336

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR CULTIVATOR

Application filed January 14, 1928. Serial No. 246,674.

The present invention relates to improvements in row crop cultivating attachments for tractors and to the manner in which such devices are mounted on and related to the tractor and to the plant rows over which the tractor travels.

The main object of the invention is to provide on a tractor an arrangement of earth working implements which will operate on the soil over and at either side of rows of growing plants along which the tractor moves, and which may include crust breaking means operating directly over or on the line of a row of growing plants.

Another object is to provide a crust breaking attachment for tractor cultivators comprising a plurality of sets of rotary tillage units capable of operating on several plant rows at once and capable of adjustment to rows of different spacings, with certain units in each set capable of adjustment to vary the width of the operating zone thereof.

The foregoing and other minor objects and advantages are attained by providing a tractor of the row crop type with front and rear tillage implements which are respectively of different character and capable of independent use, but complemental as to work performed when used together. Preferably the forward implements consist of crust breaking wheels operating on a line of the plant rows and mounted at the front of the tractor adjacent its dirigible front support, and the rear implements consist of more effective soil working means, such as cultivating shovels, which act on the "middles" or soil zones immediately adjacent either side of the path of the forward implements.

The novel combinations and details of construction in which the invention resides are hereinafter more particularly described and are illustrated in the accompanying drawings, wherein:

Figure 1 is a plan view of a complete set of attachments in position on a tractor;

Figure 2 is a similar side elevation; and

Figure 3 is a detail plan view on an enlarged scale of a crust breaking tillage unit.

In the present instance, the invention is illustrated as embodied in an organization comprising a tractor of the wide tread type having a rear axle housing 10 on the ends of which are mounted traction wheels 11. A forwardly extending frame or body 12 is centrally secured to the axle 10 and the forward end of the body 12 is supported on a steering truck comprising wheels 13 mounted on a vertical standard journaled in a central bearing 14 on the front end of the tractor body. As the tractor employed is of well known construction and, therefore, is illustrated in broken lines, further description thereof is believed to be unnecessary. The structure forming the forward portion of the cultivator attachment may be made up of a cross member or frame bar 15 which is preferably clamped to the under side of the tractor body frame in any suitable manner, with its ends projecting laterally therefrom at each side of the steering truck to points in or beyond the tread lines of the traction wheels. The ends of the crossbar 15 may be braced on the tractor frame as by forwardly converging brace rods 16 secured by bolts 17 to brackets provided on each side of the forward end of the tractor. The purpose of the crossbar 15 is to provide a horizontal, laterally extending frame member at each side of the tractor from which cultivating implements may be drawn.

In the present instance, each laterally extending portion of the bar 15 has journaled on it a pipe section, or sleeve, 20, which is freely rotatable on the bar 15. At aproximately the center of this sleeve there is clamped an upstanding arm 21. An adjusting rod 22 connects the upper end of arm 21 to an adjusting lever 23 pivotally mounted on the base of a sector 24 fixed on the axle housing 10 of the tractor. The usual latch mechanism is carried by the lever 23 for engagement with the rack sector 24, and manipulation of the lever serves to rock the arm 21 and with it the sleeve 20, as will be apparent. At either side of the arm 21 the sleeve 20 has adjustably clamped thereon the forward ends of drag beams 25, which are thus spaced apart in straddle row relation. The drag beams 25 are preferably shaped or bent to extend downwardly and then rearwardly in a horizontal direction, as best seen in Figure 2. Preferably, each beam 25 is connected to the arm 21 by a link 26 connected to a collar 27 on the beam and to an intermediate point on the arm 21, to act as a brace and to assist in lifting and lowering of the beams upon rotation of the sleeve 20. On the rear end of each beam 25 there is clamped a vertical standard 28 formed with an angular extension or foot piece 29 to the under side of which there is secured a horizontal bar 30 which extends in the direction of the length of the beam 25. Each bar 30 is preferably formed with upturned ends 31, as seen in Figure 2, and each pair of the bars 30 on the opposite beams 25 is connected by parallel shafts 32, which are clamped in the angles formed by the upturned ends 31 on bars 30, as by means of U-bolts 33. The shafts 32 serve as journals for a set of pronged wheels 35. In the preferred arrangement of these wheels a single middle wheel is mounted on the forward shaft, and two similar lateral wheels are mounted on the rear shaft, the three wheels being arranged in overlapping relation, as clearly shown in Figures 1 and 3. Each of the wheels 35 has a hub portion 36 rotatable on its shaft 32 and held in place thereon by means of set collars 37, which are adjustable along the shaft. This manner of mounting the pronged wheels on the respective shafts 32 permits of lateral adjustment of the set of wheels along the shafts, as required to meet different spacings of plant rows or to vary the spacing of the wheels in the set, the possible range of such adjustment being indicated by the dotted line position of the wheels shown in Figure 3. It will be understood that a crust breaking tillage unit, comprising the wheels 35, etc., is connected to the beams 25 on each side of the tractor and that the structures are identical.

It will be obvious that the arrangement of the crust breaking units is such that they operate directly on two plant rows over which the tractor moves and that various spacings and arrangements of the pronged wheels may be effected. The structure and position of the pronged wheels is such as to penetrate the surface soil lightly and break up any crust formation without uprooting action on young plants in the row.

The rear section of the cultivating attachment consists of a second transverse bar or member 40 which is journaled in brackets 41 fixed on the drawbar 42 of the tractor. The bar 40 is rotatably adjusted through an arm 43 secured thereon and pivotally connected to a lever 44 by means of a link 45. The lever 44 is pivoted on a rack sector 46 mounted on one arm of the drawbar 42 of the tractor. At each end and at the middle of bar 40 there are adjustably secured brackets 47 and each bracket is pivotally connected to a horizontal drag beam 48 which trails therefrom. The beams 48 are accordingly disposed in offset relation between and at each outer side of the zone of operation of the tillage units on the front of the tractor. Each beam 48 carries a group or set of soil working implements comprising in this instance cultivator plows 50 having upright standards 51 clamped to laterally extending arms 52 projecting from each side of each beam 48 and to a rearwardly extending arm 53 forming an extension of the beam. The purpose of this arrangement is to so dispose the cultivator shovels as to effectively work a strip of soil substantially equal in width to the space left between the zones operated on by the forward tillage units. Each beam 48 is connected to crossbar 40 by means of the conventional spring pressed link 54 extending from the rear portion of each beam 48 to a fixed arm 55 on each bracket 47.

With the arrangement of tillage implements disposed in groups as above set forth, there is provided crust breaking means at the forward end of the tractor, and, at the rear of the tractor, there is provided complemental tillage means for the zones adjacent those operated on by the crust breaking means, thus affording an arrangement which effects cultivation both directly over and at each side of two plant rows. Incidentally, the crust breaking means by being mounted at the front of the tractor adjacent the steerable truck will share the lateral or steering movement of the forward end of the tractor, and can thus be guided to follow minor deviations in the plant rows without materially affecting the positions of the rear units. There has accordingly been provided a novel cultivating organization for use on a tractor, as well as a novel form of crust breaking attachment for row-crop cultivators, and, while a preferred form of the invention has been described by way of example, it will be obvious to those skilled in the art that variations therefrom are possible within the scope of the following claims.

What is claimed is:

1. In a row crop cultivator, the combination with a tractor having rear traction wheels and dirigible front supporting wheels, of a crossbar mounted on the tractor in advance of the traction wheels and back of the dirigible wheels, drag beams pivoted to said bar and disposed in spaced pairs each of which is arranged to straddle a plant row along which the tractor moves, a plurality of laterally spaced pronged wheels mounted between each pair of drag beams, a second crossbar mounted on the tractor at the rear of the traction wheels, drag beams pivoted on said second crossbar at points in offset relation to the drag beams on the forward crossbar, and cultivating plows mounted on the rear drag beams and positioned to operate on the soil at either side of the path of operation of the pronged wheels.

2. In a row crop cultivator, the combination with a tractor having wide spaced rear traction wheels adapted to span two plant rows and a central front steering truck adapted to travel between said rows, of crust breaking means comprising sets of overlapping pronged wheels carried by the tractor at each side of the steering truck and located in longitudinal planes within the tread lines of the traction wheels and adapted to engage the soil at the location of the two plant rows over which the tractor moves, and soil turning implements mounted on the rear of the tractor in complemental working relation to said crust breaking means and operating in the zone between the paths of said crust breaking means and in zones immediately adjoining the outer sides of said paths.

3. In a row crop cultivator, the combination with a supporting vehicle, of a pair of drag beams pivoted to the vehicle and arranged to straddle a plant row along which the vehicle moves, and rotary soil working means mounted between said drag beams comprising parallel shafts carried by the beams, and a plurality of toothed wheels mounted on said shafts in overlapping relation and arranged to engage the soil between said beams.

4. In a row crop cultivator, the combination with a tractor having rear traction wheels and dirigible front supporting wheels, of a pair of drag beams pivoted to the front end of the tractor and arranged to straddle a plant row along which the tractor moves, and rotary soil working means mounted between said beams and comprising a plurality of transverse shafts carried by the beams and toothed wheels journaled on the respective shafts and arranged in overlapped relation.

5. In a row crop cultivator, the combination with a tractor having wide spaced rear traction wheels and a central front steering truck, of a crossbar secured to the front end of the tractor behind the truck with its ends projecting beyond each side of said truck, a sleeve journaled on each projecting portion of the crossbar, a pair of spaced drag beams adjustably clamped to each sleeve and trailing therefrom at each side of the truck and within the tread lines of the traction wheels, each pair of beams being positioned to straddle a plant row along which the tractor moves, means for raising and lowering each pair of beams by rotation of said sleeves, and soil working means carried by each pair of beams.

6. In a row crop cultivator, the combination with a tractor having wide spaced rear traction wheels and a central front steering truck, of a crossbar mounted on the front end of the tractor behind the truck with its ends projecting beyond each side of said truck, a pair of spaced drag beams pivoted to each projecting portion of said crossbar and trailing therefrom at each side of the truck and within the tread lines of the traction wheels, each pair of beams being positioned to straddle a plant row along which the tractor moves, and rotary soil working means mounted between each pair of drag beams comprising a pair of transverse shafts connecting the beams and a plurality of toothed wheels mounted on the shafts in offset relation and arranged to engage the soil between the beams.

7. A cultivator attachment for tractors comprising a pair of spaced drag beams, means for connecting one end of said beams to a tractor, parallel horizontal frame bars mounted on the other end of the beams and extending in the direction of said beams, parallel shafts connecting said frame bars, and pronged wheels journaled on the respective shafts in overlapping relation.

8. A cultivator attachment for tractors comprising a pair of spaced drag beams, means for connecting one end of said beams to a tractor, a vertical standard clamped on the other end of each beam and extending downwardly therefrom, a horizontal bar secured intermediate its ends to each standard and extending in the direction of the beams, parallel shafts connecting said horizontal bars, and pronged wheels journaled on the respective shafts and disposed in overlapped relation.

9. A crust breaking attachment for cultivators comprising spaced longitudinally extending bars adapted to straddle a plant row, means for connecting the forward ends of said bars to a vehicle, parallel transverse shafts connecting said bars, a pronged wheel journaled on the forward one of said shafts, and a pair of similar pronged wheels journaled on the other shaft at either side of and overlapping said forward wheel.

In testimony whereof I affix my signature.

BERT R. BENJAMIN.